(12) United States Patent
Aiken et al.

(10) Patent No.: US 7,044,646 B1
(45) Date of Patent: May 16, 2006

(54) CENTER BEARING BRACKET AND SUPPORT

(75) Inventors: Albert Aiken, Toledo, OH (US); Virginia L. McClanahan, Toledo, OH (US); Michael D. Penn, Toledo, OH (US)

(73) Assignee: Torque-Traction Technologies LLC, Maumee, OH (US)

( * ) Notice: Subject to any disclaimer, the term of this patent is extended or adjusted under 35 U.S.C. 154(b) by 0 days.

(21) Appl. No.: 08/461,657

(22) Filed: Jun. 5, 1995

Related U.S. Application Data

(63) Continuation of application No. 07/983,889, filed on Dec. 1, 1992, now abandoned.

(51) Int. Cl.
*F16C 27/06* (2006.01)

(52) U.S. Cl. ..................................................... 384/536
(58) Field of Classification Search ................ 384/536, 384/535, 582, 581, 222, 218
See application file for complete search history.

(56) References Cited

U.S. PATENT DOCUMENTS

| | | | |
|---|---|---|---|
| 2,135,902 A | 11/1938 | Leister ........................ | 384/536 |
| 2,211,295 A | 8/1940 | Searles et al. .............. | 384/536 |
| 2,484,725 A | 10/1949 | Parker ......................... | 384/442 |
| 2,521,638 A | 9/1950 | Lamm ......................... | 384/536 |
| 2,536,424 A | 1/1951 | Curtis ......................... | 384/217 |
| 2,560,759 A | 7/1951 | Evernden et al. ........ | 384/218 X |
| 2,580,119 A | 12/1951 | Meyers ....................... | 384/222 |
| 2,893,790 A | 7/1959 | Raes et al. .................. | 384/536 |
| 2,897,023 A | 7/1959 | Burkhalter et al. ......... | 384/536 |
| 2,906,572 A | 9/1959 | Wroby ........................ | 384/536 |
| 2,933,354 A | 4/1960 | Primeau ..................... | 384/536 |
| 3,140,901 A | 7/1964 | Young ......................... | 384/536 |
| 3,166,362 A | 1/1965 | Slaght ......................... | 384/582 |
| 3,309,154 A | 3/1967 | Stokely ....................... | 384/536 |
| 3,382,017 A | 5/1968 | Cripe .......................... | 384/536 |
| 3,639,015 A | 2/1972 | Mass .......................... | 384/536 |

(Continued)

FOREIGN PATENT DOCUMENTS

GB          2172938 A          10/1986

OTHER PUBLICATIONS

Dana drawing 230119, dated May 27, 1954.

(Continued)

*Primary Examiner*—Thomas R. Hannon
(74) *Attorney, Agent, or Firm*—MacMillan, Sobanski & Todd, LLC

(57) ABSTRACT

A center bearing assembly includes a generally U-shaped bracket and a support member containing a bearing. In a first embodiment, a plurality of openings is formed through the bracket. Each of the openings has axially forward and rearward tabs provided thereon which extend inwardly toward the center of the bracket. The outer surface of the support member is formed having a plurality of outwardly extending protrusions. When the support member is installed in the bracket, the outwardly extending protrusions of the support member are received within the openings formed in the legs of the bracket to prevent the support member from being withdrawn radially from the bracket. Portions of the axially facing surfaces of the support member are engaged respectively by the tabs to prevent the support member from moving axially relative to the bracket. In a second embodiment, a plurality of openings is formed through the bracket, and a pair of circumferential inwardly extending flanges is provided thereon. The protrusions of the support member cooperate with the openings formed through the bracket to retain it therein.

17 Claims, 2 Drawing Sheets

U.S. PATENT DOCUMENTS

| | | | |
|---|---|---|---|
| 3,961,829 A | 6/1976 | Bowen et al. | 384/536 |
| 4,392,694 A | 7/1983 | Reynolds | 384/536 |
| 4,463,993 A | 8/1984 | Brissette et al. | 384/536 |
| 4,542,996 A | 9/1985 | Brissette et al. | 384/536 |
| 4,571,098 A | 2/1986 | Rudnik | 384/536 X |
| 5,161,903 A | 11/1992 | March | 384/536 |

OTHER PUBLICATIONS

Dana drawing 230164, dated Feb. 8, 1955.
Dana drawing 230167, dated Feb. 8, 1955.
Dana drawing 231247, dated Jun. 14, 1977.

CENTER BEARING BRACKET AND SUPPORT

This is a continuation of application Ser. No. 07/983,889 filed on Dec. 1, 1992 now abandoned

BACKGROUND OF THE INVENTION

This invention relates in general to bearings for supporting shafts for rotation and in particular to an improved structure for a center bearing assembly for rotatably supporting an intermediate portion of a vehicle drive line or coupling shaft assembly.

In most rear wheel drive vehicles, a source of rotational energy, such as an internal combustion or diesel engine, is located near the front of the vehicle. The engine is connected by means of a drive line to rotate one or more driven wheels, which are located near the rear of the vehicle. The drive line typically extends between a transmission, which is connected to the engine, and a differential, which is connected to the driven wheels. In some vehicles, the distance separating the transmission and the differential is relatively short. In these vehicles, the drive line is composed of a single tube, which is usually referred to as a drive shaft. In other vehicles, the distance separating the transmission and the differential is relatively long, making the use of a one-piece drive shaft impractical. In these vehicles, the drive line is composed of a drive shaft and one or more coupling shafts. The coupling shafts are connected to the drive shaft (and each other) by universal joints.

Drive lines which are composed of a drive shaft and one or more coupling shafts require the use of one or more intermediate resilient support structures, which are typically referred to as center bearing assemblies. A typical center bearing assembly includes an annular ball bearing, within which the coupling shaft is rotatably supported. The ball bearing is itself disposed within a generally annular resilient support member. The resilient support member is, in turn, disposed within a generally U-shaped bracket which is secured to the lower surface of a cross member extending between the side rails of the vehicle frame. The resilient support member is provided to reduce vibrations of the drive line in the vicinity of the center bearing assembly and to prevent any such vibrations from being transmitted to the vehicle frame. Many center bearing assembly structures of this general type are known in the art.

As is commonly known in modern vehicle manufacturing methods, the drive shaft, the coupling shafts, and the center bearing assemblies are frequently fabricated in one location, stored in a second location, then shipped to a third location for assembly into the vehicle frame. Because the ball bearings and the resilient support members of the center bearing assemblies are annular in shape, they cannot be accidentally removed from the coupling shaft during storage and shipment. However, the U-shaped brackets which secure the ball bearings and the resilient support members to the vehicle frame can be accidentally removed if not restrained. A number of such bracket restraints are known in the art for preventing the bracket from becoming dislodged from the remainder of the center bearing assembly. Nonetheless, it would be desirable to provide an improved structure for retaining these U-shaped brackets on their associated center bearing assemblies which is simple and inexpensive in structure and construction.

SUMMARY OF THE INVENTION

This invention relates to an improved structure for retaining a bracket on a resilient support member for a center bearing assembly. The bracket includes a generally U-shaped body portion having a pair of outwardly extending end portions provided at the ends thereof. Respective apertures are formed through the end portions to permit the bracket to be secured to a cross member of a frame of a vehicle. In a first embodiment of the invention, a plurality of openings is formed through the body portion of the bracket. Each of the openings has axially forward and rearward tabs provided thereon which extend inwardly toward the center of the bracket. The center bearing assembly further includes a resilient support member having an enlarged axially extending opening formed through the center thereof. The outer surface of the support member is formed having a plurality of outwardly extending protrusions. When the support member is installed in the bracket, portions of the axially forwardly and rearwardly facing surfaces of the support member are engaged respectively by the tabs to prevent the support member from moving axially forwardly or rearwardly relative to the bracket. At the same time, the outwardly extending protrusions are received within the openings formed in the legs of the bracket to prevent the support member from being withdrawn upwardly from the bracket. In a second embodiment of the invention, a plurality of openings is formed through the body portion of the bracket, and a pair of circumferential inwardly extending flanges is provided thereon. The protrusions of the support member cooperate with the openings formed through the bracket to retain it therein, in the same manner as the first embodiment.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
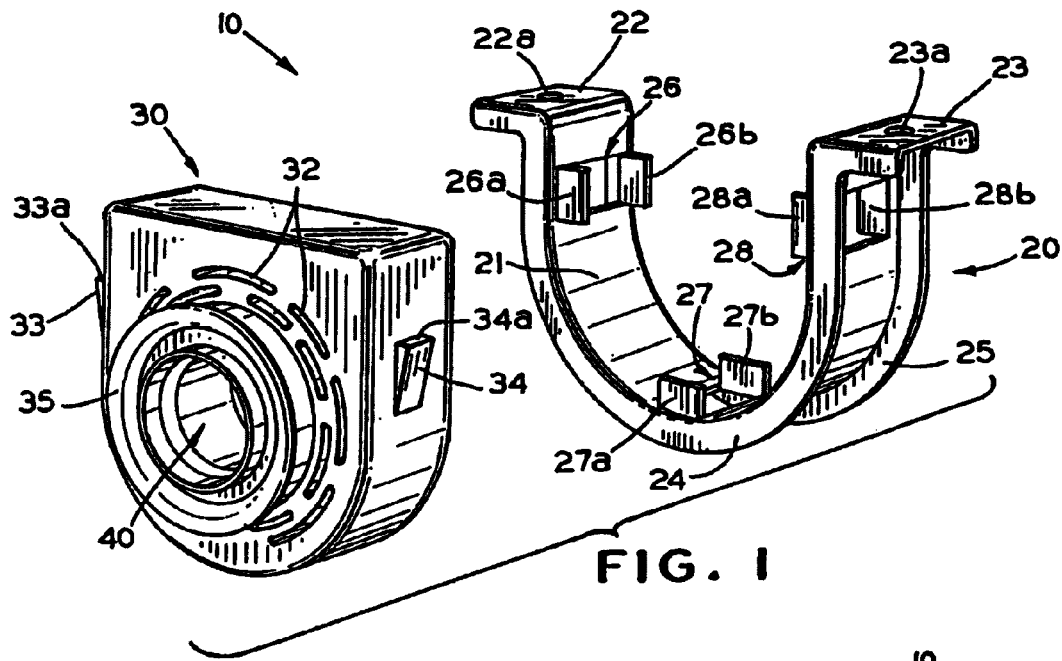
FIG. 1 is an exploded perspective view of a first embodiment of a center bearing assembly in accordance with this invention.
Figure 2:
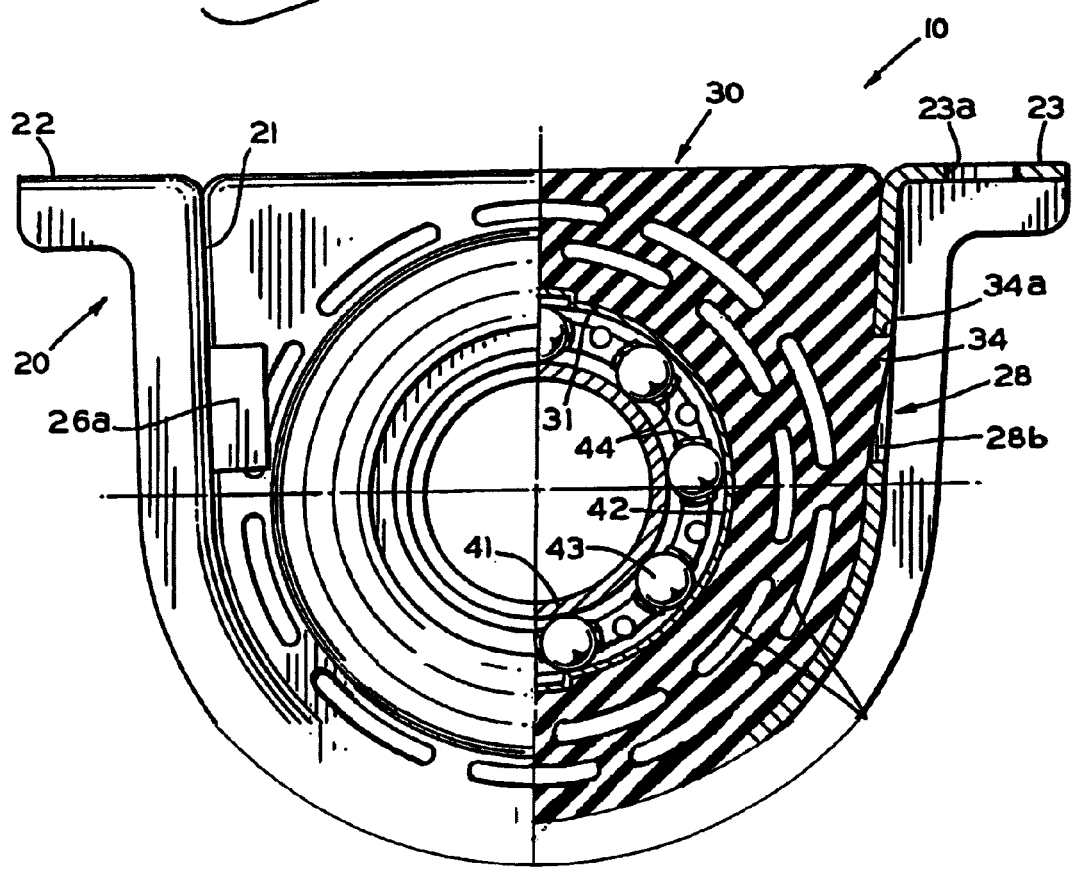
FIG. 2 is a front elevation view, partially in cross section, of the assembled center bearing assembly illustrated in FIG. 1.

Referring now to the drawings, there is illustrated in FIGS. 1 and 2 a first embodiment of a center bearing assembly, indicated generally at 10, in accordance with this invention. As is well known in the art, the center bearing 10 is adapted to be secured to a cross member (not shown) of a frame of a vehicle or other support member so as to rotatably support a shaft (not shown) or other component for rotation. The general structure and operation of the center bearing assembly 10 is well known in the art and, for the sake of brevity, will not be repeated herein. U.S. Pat. No. 4,392,694 to Reynolds, owned by the assignee of this invention, discusses the general structure and operation of center bearing assemblies, and the disclosure thereof is incorporated herein by reference.

The center bearing assembly 10 includes a bracket, indicated generally at 20. The bracket 20 includes a generally U-shaped body portion 21 having a pair of outwardly extending end portions 22 and 23 provided at the ends thereof. Respective apertures 22a and 23a are formed through the end portions 22 and 23. As will be explained in further detail below, the apertures 22a and 23a are provided to secure the bracket 20 to the cross member of the frame of the vehicle. A pair of outwardly extending circumferential flange portions 24 and 25 are provided through the lengths of the body portion 21 and the end portions 22 and 23. The flange portions 24 and 25 are provided to stiffen and strengthen the bracket 20.

As best shown in FIG. 1, a plurality of openings, indicated generally at 26, 27, and 28, are formed through the body portion 21 of the bracket 20. The first opening 26 is located near the center of the first leg of the body portion 21. The first opening 26 is preferably formed by punching slits through body portion 21 of the bracket 20, then bending tabs 26a and 26b inwardly toward the center of the U-shaped body portion 21. The tabs 26a and 26b, therefore, are located on the forward and rearward axial ends of the first opening 26. The second opening 27 is located near the center of the bottom of the body portion 21, while the third opening 28 is located near the center of the second leg of the body portion 21. The second and third openings 27 and 28 may be formed in the same manner as the first opening 26. As a result, the second opening 27 is defined by a pair of tabs 27a and 27b, while the third opening 28 is defined by a pair of tabs 28a and 28b. The purposes of the openings 26, 27, and 28 and their respective pairs of tabs, 26a and 26b, 27a and 27b, and 28a and 28b will be explained below.

The center bearing assembly 10 further includes an elastomeric support member, indicated generally at 30. The support member 30 has an enlarged axially extending opening 31 formed through the center thereof. The purpose of this opening will be explained below. About the central opening 31, a plurality of arcuate slots 32 are preferably formed through the support member 30. The slots 32 are preferably arranged in two concentric circular rows about most of the opening 31 and are preferably radially staggered throughout. The slots 32 provide an added measure of flexibility to the elastomeric support member 30.

The outer surface of the support member 30 is formed having a pair of outwardly extending protrusions 33 and 34. As best shown in FIG. 2, these protrusions 33 and 34 are preferably formed integrally with the support member 30 and are located on opposite sides thereof. The illustrated protrusions 33 and 34 are generally ramp-shaped in cross section, having an outer surface which tapers outwardly from the support member 30 as it progresses upwardly from bottom to top. The protrusions 33 and 34 terminate in respective end surfaces 33a and 34a which extend directly outwardly from the body of the support member 30. Although two generally ramp-shaped protrusions 33 and 34 are illustrated, it will be appreciated that the size, shape, location, and number of such protrusions may vary.

The support member 30 is sized to be received within the U-shaped body portion 21 of the bracket, as shown in FIG. 2. This is accomplished by initially positioning the support member 30 above the bracket 20 in axial alignment with the tabs 26a, 26b, 27a, 27b, 28a, and 28b. Then, the support member 30 is moved downwardly within the bracket 20 to the position illustrated in FIG. 2. When installed in this manner, portions of the axially forwardly facing surface of the support member 30 are engaged respectively by the tabs 26a, 27a, and 28a. Similarly, portions of the axially rearwardly facing surface of the support member 30 are engaged respectively by the tabs 26b, 27b, and 28b. Thus, the tabs 26a, 26b, 27a, 27b, 28a, and 28b prevent the support member 30 from moving axially forwardly or rearwardly relative to the bracket 20.

At the same time, the outwardly extending protrusions 33 and 34 are received within the openings 26 and 28, respectively, formed in the legs of the bracket 20. During the installation process, such protrusions 33 and 34 are compressed as they slide along the inner surface of the body portion 21 of the bracket 20. When the support member 30 is properly positioned within the bracket 20 as shown in FIG. 2, the protrusions 33 and 34 resiliently snap outwardly into the openings 26 and 28. When this occurs, the end surfaces 33a and 34a of the protrusions 33 and 34 abut the edges of the openings 26 and 28. As a result, the protrusions 33 and 34 prevent the support member 30 from being withdrawn upwardly from the bracket 20.

As shown in FIG. 1, the axially forwardly facing end of the support member 30 may be formed having a conventional flexible lip 35 thereon. The flexible lip 35 can extend into an annular region defined by a conventional annular shield (not shown). The flexible lip 35 and the annular shield are provided to minimize the entry of dirt and other contaminants into the components of the center bearing assembly 10. A similar flexible lip (not shown) and annular shield (not show) may be provided on the axially rearwardly facing end of the support member 30. Also, the center bearing assembly 10 may be provided with a conventional slinger (not shown) for the purpose of further minimizing the entry of dirt and other contaminants into the components of the center bearing assembly 10.

Lastly, the bearing assembly 10 includes a conventional ball bearing, indicated generally at 40. The ball bearing 40 includes an inner race 41, and outer race 42, and a plurality of balls 43 disposed therebetween. A plastic or similar material cage 44 may be provided between the inner race 41 and the outer race 42 to retain the balls 43 therein. The inner race 41 is adapted to engage and support a rotatable shaft (not shown) therein, while the outer race 42 is mounted within the central axial opening 31 formed through the support member 30. In a manner which is well known in the art, the balls 43 permit the inner race 41 (and the shaft supported therein) to rotate relative to the outer race 42 (and the remainder of the center bearing assembly 10).

Typically, the center bearing assembly 10 is assembled onto a coupling shaft at the point of manufacture thereof. Then, the entire coupling shaft assembly (including the center bearing assembly 10) can be stored or shipped to another location. The cooperation of the protrusions 33 and 34 with the openings 26 and 28 prevents the bracket 20 from becoming radially dislodged during storage and shipment. Later, the center bearing assembly 10 can be secured to the cross member of the frame of the vehicle or other surface by means of conventional threaded fasteners (not shown) which extend upwardly through the apertures 22a and 23a formed through the flange portions 22 and 23 of the bracket 20.

Figure 3:
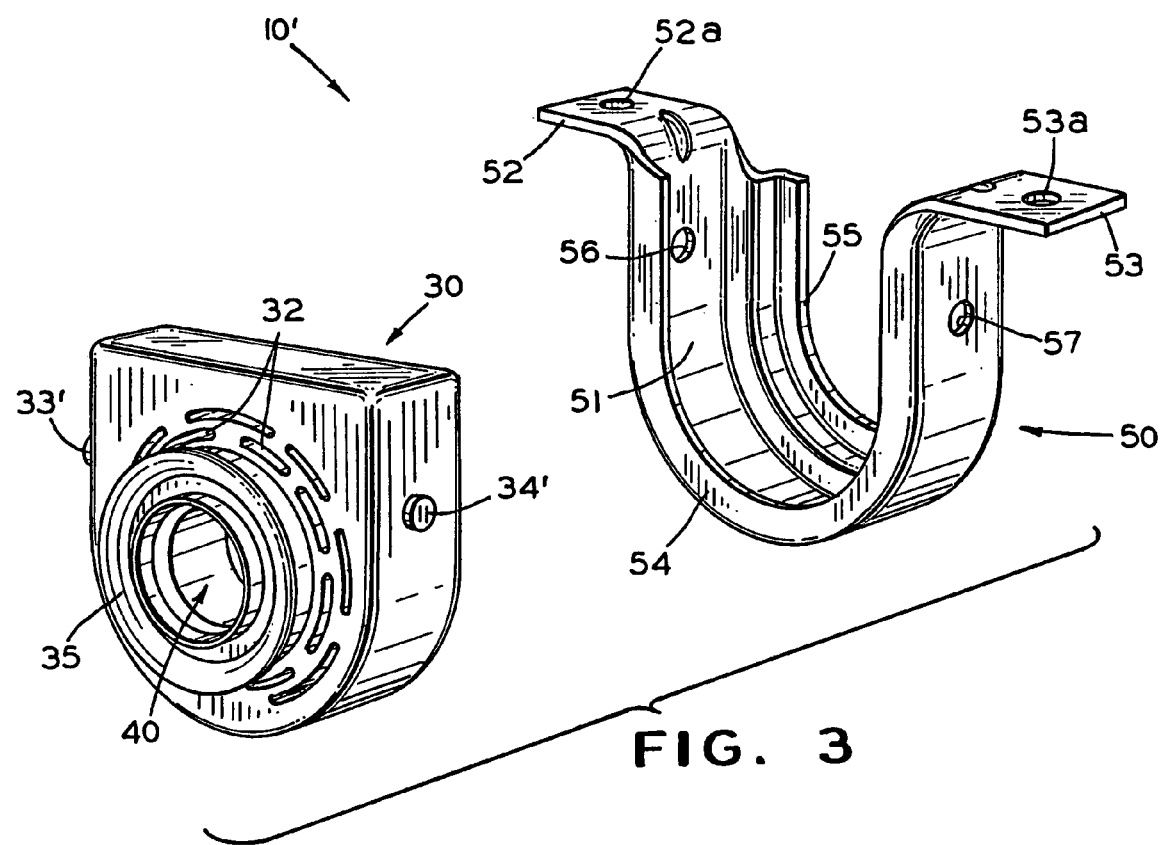
FIG. 3 is an exploded perspective view of a second embodiment of a center bearing assembly in accordance with this invention.

FIG. 3 illustrates a second embodiment of a center bearing assembly, indicated generally at 10', in accordance with this invention. The second center bearing assembly 10' is similar to the first center bearing assembly 10 discussed above, and like reference numbers are used to indicate like parts. The second center bearing assembly 10' includes a modified bracket, indicated generally at 50. The bracket 50 includes a generally U-shaped body portion 51 having a pair of outwardly extending end portions 52 and 53 provided at the ends thereof. Respective apertures 52a and 53a are formed through the end portions 52 and 53. A pair of inwardly extending circumferential flange portions 54 and 55 are provided through the length of the body portion 51. The flange portions 54 and 55 are provided to stiffen and strengthen the bracket 50 and to prevent axial movement of the support member 30, in lieu of the tabs 26a, 26b, 27a, 27b, 28a, and 28b discussed above.

A pair of openings, indicated generally at 56 and 57 are formed through the body portion 51 of the bracket 50. The first opening 56 is located near the center of the first leg of the body portion 51, while the second opening 57 is located near the center of the second leg of the body portion 51. In this embodiment, the openings 56 and 57 are merely punched through the body portion 51 of the bracket 50, thus providing no tabs as discussed above.

A support member 30' is provided which is similar to the support member 30 described above. The support member 30' is provided with outwardly extending protrusions 33' and 34' which are generally cylindrical in shape. The ball bearing 40 is similar to that described above. The protrusions 33' and 34' of the support member 30' cooperate with the openings 56 and 57 formed through the bracket 50 to retain it therein, in the same manner as the first embodiment of the center bearing assembly 10.

This invention has been explained and illustrated as having openings 26, 27, and 28 formed completely through the legs of the bracket 20 in FIGS. 1 and 2, as well as having openings 56 and 57 formed completely through the legs of the bracket 50 in FIG. 3. It will be appreciated, however, that these openings need not be formed completely through the legs of the respective brackets. Rather, such openings may be embodied as recesses formed in the inner surfaces of the legs of the brackets. The outwardly extending protrusions formed on the support members could cooperate with such recesses without having to extend completely through the legs of the brackets. Thus, as used herein, the term "openings" includes both openings formed completely through the legs of the brackets and recesses formed in such legs.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A bearing assembly for rotatably supporting a shaft relative to a support surface comprising:
    a bracket adapted to be secured to the support surface, said bracket having an opening formed therein;
    a support member supported by said bracket, said support member having a protrusion formed from a resilient material extending outwardly therefrom into said opening of said bracket, said support member having an opening formed therethrough; and
    a bearing supported within said opening of said support member, said bearing adapted to rotatably support the shaft therein.

2. The bearing assembly defined in claim 1 wherein said protrusion is generally formed in the shape of a ramp.

3. The bearing assembly defined in claim 1 wherein said protrusion is formed generally in the shape of a cylinder.

4. The bearing assembly defined in claim 1 wherein said protrusion is formed integrally with said support member.

5. The bearing assembly defined in claim 1 further including a structure for preventing said support member from moving axially relative to said bracket.

6. The bearing assembly defined in claim 5 wherein said structure for preventing axial movement includes at least one tab formed on each axial side of said bracket, said tabs extending over portions of said support member to prevent said support member from moving axially relative to said bracket.

7. The bearing assembly defined in claim 6 wherein said tabs are formed adjacent to said opening.

8. The bearing assembly defined in claim 5 wherein said structure for preventing axial movement includes a continuous flange portion formed on each axial side of said bracket, said flange portions extending over portions of said support member to prevent said support member from moving axially relative to said bracket.

9. The bearing assembly defined in claim 1 wherein said bracket includes first and second legs that are adapted to be secured to the support surface.

10. The bearing assembly defined in claim 9 wherein said opening is a first opening that is formed in said first leg of said bracket, a second opening is formed through said second leg of said bracket, and said support member has first and second protrusions extending outwardly therefrom respectively into said first and second openings of said first and second legs of said bracket.

11. The bearing assembly defined in claim 10 wherein each of said protrusions is generally formed in the shape of a ramp.

12. The bearing assembly defined in claim 10 wherein each of said protrusions is formed generally in the shape of a cylinder.

13. The bearing assembly defined in claim 10 wherein each of said protrusions is formed integrally with said support member.

14. The bearing assembly defined in claim 10 further including a structure for preventing said support member from moving axially relative to said bracket.

15. The bearing assembly defined in claim 14 wherein said structure for preventing axial movement includes at least one tab formed on each axial side of said bracket, said tabs extending over portions of said support member to prevent said support member from moving axially relative to said bracket.

16. The bearing assembly defined in claim 15 wherein said tabs are formed adjacent to said opening.

17. The bearing assembly defined in claim 14 wherein said structure for preventing axial movement includes a continuous flange portion formed on each axial side of said bracket, said flange portions extending over portions of said support member to prevent said support member from moving axially relative to said bracket.

* * * * *